United States Patent
Banchelin (10) Patent No.: US 11,151,436 B2
(45) Date of Patent: Oct. 19, 2021

(54) METHOD FOR AUTHORISING A COMMUNICATION WITH A PORTABLE ELECTRONIC DEVICE, SUCH AS ACCESS TO A MEMORY ZONE, CORRESPONDING ELECTRONIC DEVICE AND SYSTEM

(75) Inventor: Xavier Banchelin, Bandol (FR)

(73) Assignee: THALES DIS FRANCE SA, Meudon (FR)

(*) Notice: Subject to any disclaimer, the term of this patent is extended or adjusted under 35 U.S.C. 154(b) by 1073 days.

(21) Appl. No.: 12/747,619

(22) PCT Filed: Dec. 10, 2008

(86) PCT No.: PCT/EP2008/067171
§ 371 (c)(1),
(2), (4) Date: Jun. 11, 2010

(87) PCT Pub. No.: WO2009/077398
PCT Pub. Date: Jun. 25, 2009

(65) Prior Publication Data
US 2010/0263034 A1   Oct. 14, 2010

(30) Foreign Application Priority Data
Dec. 18, 2007 (EP) .................................. 07301688

(51) Int. Cl.
*H04L 29/06* (2006.01)
*G06K 19/073* (2006.01)
(Continued)

(52) U.S. Cl.
CPC .......... *G06K 19/073* (2013.01); *G07C 9/215* (2020.01); *G06F 21/31* (2013.01); *G07C 9/253* (2020.01); *H04L 63/08* (2013.01)

(58) Field of Classification Search
CPC ................................................... H04L 63/08
(Continued)

(56) References Cited

U.S. PATENT DOCUMENTS

| 4,720,860 A | 1/1988 | Weiss |
| 4,910,775 A * | 3/1990 | Yves ...................... A63F 13/12 |
| | | 235/379 |

(Continued)

FOREIGN PATENT DOCUMENTS

| EP | 1 773 018 A1 | 4/2007 |
| WO | WO 97/36264 A1 | 10/1997 |
| WO | WO 9736264 A1 * | 10/1997 |

OTHER PUBLICATIONS

El-Fishway, Nawal, Mostafa Nofal, and Albert Tadros. "An effective approach for authentication of mobile users." In Vehicular Technology Conference, 2002. VTC Spring 2002. IEEE 55th, vol. 2, pp. 598-601. IEEE, 2002.*

(Continued)

*Primary Examiner* — Samson B Lemma
(74) *Attorney, Agent, or Firm* — Buchanan Ingersoll & Rooney PC (57) ABSTRACT

The invention relates to a method for authorizing a communication with a portable electronic device, such as access to at least one memory area. The portable electronic device has a display for presenting an item of information visible to the outside and an interface for communication with the outside of the portable electronic device. The item of information is at least in part taken into account by the portable electronic device to authorize the communication. The method includes optically reading of the item of information outside the portable electronic device. The method also includes a step of varying the item of information, the step of varying causing the item of information, termed the variable item of information, to vary at least in part. The invention also relates to the portable electronic device, and the system comprising the portable electronic device and an electronic communication or reading device.

21 Claims, 2 Drawing Sheets

(51) Int. Cl.
*G07C 9/20* (2020.01)
*G07C 9/25* (2020.01)
*G06F 21/31* (2013.01)

(58) Field of Classification Search
USPC .................................. 713/182–186; 726/1–36
See application file for complete search history.

(56) References Cited

U.S. PATENT DOCUMENTS

| | | | | |
|---|---|---|---|---|
| 5,060,263 | A * | 10/1991 | Bosen | G07F 7/1008 713/184 |
| 5,544,086 | A * | 8/1996 | Davis | G06Q 20/341 705/68 |
| 5,559,887 | A * | 9/1996 | Davis | G06Q 20/363 705/68 |
| 5,802,176 | A * | 9/1998 | Audebert | H04L 9/0863 713/184 |
| 6,477,547 | B1 * | 11/2002 | Yoshimura | G06F 21/445 |
| 7,159,121 | B2 * | 1/2007 | Takaragi | H04L 9/3231 340/5.82 |
| 7,814,332 | B2 * | 10/2010 | Beenau et al. | 713/186 |
| 8,037,315 | B2 * | 10/2011 | Miyazaki | G06K 9/0002 713/186 |
| 2002/0049908 | A1 * | 4/2002 | Shimosato | G06Q 20/341 713/186 |
| 2002/0109580 | A1 * | 8/2002 | Shreve et al. | 340/5.61 |
| 2002/0194499 | A1 * | 12/2002 | Audebert et al. | 713/201 |
| 2006/0047971 | A1 * | 3/2006 | Miyazaki | G06K 9/0002 713/186 |
| 2006/0294023 | A1 * | 12/2006 | Lu | G06F 21/34 705/67 |
| 2007/0150736 | A1 * | 6/2007 | Cukier et al. | 713/172 |
| 2007/0220597 | A1 * | 9/2007 | Ishida | 726/8 |
| 2008/0212771 | A1 * | 9/2008 | Hauser | H04L 63/0853 380/44 |
| 2009/0113527 | A1 * | 4/2009 | Naaman et al. | 726/5 |
| 2009/0282258 | A1 * | 11/2009 | Burke et al. | 713/184 |
| 2010/0030693 | A1 * | 2/2010 | Beenau et al. | 705/64 |
| 2010/0052852 | A1 * | 3/2010 | Mohanty | 340/5.83 |
| 2010/0275010 | A1 * | 10/2010 | Ghirardi | 713/155 |

OTHER PUBLICATIONS

International Search Report (PCT/ISA/210) dated Jan. 23, 2009.
Written Opinion (PCT/ISA/237) dated Jan. 23, 2009.
European Office Action dated Mar. 20, 2017 in corresponding European Patent Application 08 862 675.9-1927.

* cited by examiner

METHOD FOR AUTHORISING A COMMUNICATION WITH A PORTABLE ELECTRONIC DEVICE, SUCH AS ACCESS TO A MEMORY ZONE, CORRESPONDING ELECTRONIC DEVICE AND SYSTEM

TECHNICAL FIELD OF THE INVENTION

The invention concerns a process for authorising communication with a portable electronic device, such as access to at least one memory zone of the device.

The invention also pertains to such a portable electronic device comprising at least one memory zone.

In addition, the invention is about an electronic system comprising at least one electronic communication device, mainly for reading and interacting with such a portable electronic device.

The invention is deemed to be applicable in general for controlling the functioning of a device, preferably of the portable kind. The device is of type that authorises or prohibits an operation. The functioning can be total or partial and can in particular include read or write memory access authorisation, communication of the device with the outside through means of communication, etc.

A portable electronic device means any device comprising means for checking and processing information and the means for memorising data. This data can be accessed from the outside especially in read mode or sent to the outside. The portable object is preferably kept in the pocket, a bag, etc.

Typically, a portable electronic device can be in the form of a portable embedded object (or "token"), such as a chip card, comprising at least one logical processing unit or at least one micro-processor, at least one memory and at least one communication interface. The communication interface is responsible for the external communication of the portable electronic device.

The portable electronic device can interact with an electronic communication or read device, in order to be able to operate, at least in part, one or more applications supported by the portable electronic device through the communication or read electronic device.

PRIOR ART

An electronic passport comprising one "data page" is known to act as a portable electronic device specific to its bearer. The passport has a contactless communication module chip of PICC type (acronym for "Proximity Integrated Circuit Card"). The chip is integrated within the passport constituting a Machine Readable Travel Document (or MRTD). The data page reserves a zone in which information specific to the user is visible. Such a zone defines a Machine Readable Zone meant to be read either by human eye or by a machine by passing the visible information zone in front of an optical reader. The visible item of information is known to the chip, in order to be able to use it mainly for authorising or prohibiting access to a chip's memory zone.

The optical reader reads the visible item of information. The optical reader sends the read item of information to a contactless reader, to which the optical reader is connected. The contactless reader uses the read item of information by implementing a Basic Access Control mechanism (or BAC) according to the ICAO (International Civil Aviation Organisation) specifications in order to be able to communicate with the chip.

Next, the contactless reader exchanges information with the chip, though a contactless communication link, for example of the ISO (International Standardisation Organisation) 14 443 type. The exchange of information allows access to the chip's memory zone.

However, such a known solution has a major disadvantage. In fact, the visible item of information constitutes the only item of information to be known for accessing the chip's memory zone; such a solution suffers from minor entropy. In other words, the quantity of information to be known is less since it gets limited to just the information visible. The basic access control mechanism is thereby specifically perceptible to an exhaustive type attack, through which all the possible items of information need to be tried of which some may be predictable.

Thus, a person having wrong intentions can, without the knowledge of the bearer, access the chip's memory zone, by working on a single copy of the visible item of information or by finding it.

DISCLOSURE OF INVENTION

The invention overcomes the major disadvantage stated earlier by offering, according to a preferred embodiment, a process for accessing at least one memory zone of a portable electronic device. However, it can pertain to a process for establishing communication, since the portable object sends data; the communication is permitted based on the processing of visible item of information conducted through the outside.

More specifically, the invention is a process for authorising communication with a portable electronic device, such as access to at least one memory zone. The portable electronic device comprises means to present visible item of information to the outside. In addition, the portable device includes means of communication with its external environment; the item of information is, at least in part, taken into account by the portable electronic device to authorise or prohibit communication, such as access to a memory; The process comprises an optical reader step of the item of information to the outside of the portable electronic device.

According to the invention, the process comprises an information variation step, according to which the information varies at least in part.

The general principle of the invention therefore relies on a new approach wherein the visible item of information shown to the outside is not frozen as such in the solution of the prior art explained above, but is changeable. In itself, the item of information can change, especially from a presentation session to a subsequent presentation session or mainly at the initiative of the device bearer.

Consequently, such information change possibility increases the quantity of information to be dealt with in order to access the memory zone of the portable electronic device.

The type of information is not restricted; it must just be visible to the outside. Thus, for example, it can pertain to a pictogram, a sign, an image, one or more alphanumerical characters, a 2-D or 3-D bar code, a laser readable motif and/or any combination of such or other items.

We understand that such an increase in the quantity of information results in an improvement in the entropy in relation to the one that is inherent to the known solution described above. Improvement of the entropy results in reduction in the probability of theft of the visible information used for accessing the memory zone of the portable electronic device.

As for as the optical reading of the visible information, it is performed either by a human eye or by an optical reader device.

It must be noted that the expression "visible information" means a piece of information that is especially perceptible by an optical reader.

Thus, the visible information can be read in accordance with any external presentation. We can especially cite presentation of visible information on a same plane or on several planes, for a three-dimensional data.

Due to the variable nature of the information, the access to the portable electronic device's memory zone becomes more complex.

According to another feature, the invention is a portable electronic device including a memory zone.

Specifically, the portable electronic device comprises, in addition, means to present visible item of information to the outside and means to communicate with the outside. In addition, the portable electronic device comprises means for taking into account, at least in part, the visible item of information in order to authorise or prohibit access, from the outside of the portable electronic device, to the memory zone.

According to the invention, the portable electronic device comprises information variation means which will vary the item of information at least in part.

As far as the portable electronic device is concerned, it constitutes a portable embedded object (or "token") that can take on various forms. For example, it can be a USB type key (acronym for "Universal Serial Bus"), a dongle (that does not need specific reader to communicate with a Personal Computer (or PC) or a SIM card (acronym for "Subscriber Identity Module") provided with at least one communication interface, such as, for example, an ISO 14 443 type contactless communication interface.

Lastly, the invention is about an electronic system comprising at least one electronic communication or read device, interacting with the portable electronic device as stated earlier.

Specifically, the invention is a system for authorising communication such as an access to at least one memory zone of a portable electronic device; The portable electronic device comprises means of communication with the outside of the portable electronic device, and means for taking into account, at least in part, the item of information to authorise or prohibit communication, such as an access to the said (at least one) memory zone; Wherein, the system comprises the portable electronic device and an electronic communication or read device for especially allowing access to the said (at least one) memory zone, According to the invention, the portable electronic device comprises information variation means, wherein the variation means vary the item of information or the variable item of information, at least in part. In addition, the electronic communication or read device is suited for reading or retrieving variable item of information and for communicating an item of information to the portable electronic device based at least in part on the variable item of information.

It must be noted that the visible and variable item of information is presented to the outside either by the portable electronic device or by any other electronic device interacting with the portable electronic device, such as a host device. The host device is connected to the portable electronic device. A host device could be a mobile telephone, a Personal Digital Assistant (or PDA), or a PC. In addition, the host device can itself be connected to a communication network, such as of the mobile telecommunication type, and/or of the network type, such as the Internet.

As the electronic device for reading, it can, for example, pertain to a PC provided with "Optical Character Recognition" (or OCR) means and at least one contact or contactless (radio frequency or infra red type) communication interface.

As a portable electronic device, it can, for example, pertain to a "dongle" provided with a contact type communication interface such as USB, SD (acronym for "Secure Digital") or MMC (acronym for "Multi-Media Card") and a contactless communication interface (of radio frequency type, for example Bluetooth type, or infra red).

DESCRIPTION OF THE DRAWINGS

Other characteristics and advantages of the invention will appear on reading the description of a preferred unique form of embodiment of the invention, which is given only as a simple non-exhaustive example for reference and by referring to the appended drawings wherein.

DESCRIPTION OF A FORM OF EMBODIMENT

The aim of the form of embodiment explained in connection with the appended figures is not to reduce the scope of the invention; therefore, several modifications can be made to it without in any way deviating from its scope.

We will especially note that the portable electronic device of the invention can take on different forms.

It can especially pertain to an autonomous or non autonomous portable electronic device.

In the present patent document, the portable electronic device is autonomous, i.e., other than the read device, it does not need any other electronic device in order to operate.

As an autonomous portable electronic device, we can cite, in particular, a chip card for electronic payment, a chip card for validating a ticket, a chip card for the identification of an object or a person.

As an non autonomous portable electronic device, i.e. which means that in addition to the read device it needs another electronic device, such as a host device, we are giving here below an example of a system containing a subscriber identity module complete with a contactless interface.

As already known, a system comprises a SIM card (acronym for "Subscriber Identity Module") with a NFC (Near Field Communication) type interface interacting with a mobile telephone. The said SIM-NFC card supports at least two applications. The card has a first ISO 7816 type contact interface to implement a subscriber identification application, and a second NFC type contactless interface to implement an electronic payment application, an application for the payment and/or validation of a ticket, and/or access control document.

According to a first particular embodiment, the invention is implemented by a system including the SIM-NFC card, as a portable electronic device, which cooperates with the mobile telephone as the host device, and a contactless reader as an electronic read device. The SIM-NFC card presents a variable item of information, mainly by using the screen of the mobile telephone. The variable item of information can be read by a person with naked eye. The person sends the variable item of information displayed on the contactless reader by entering it, for example, with the help of a keypad provided with the contactless reader. The contactless reader processes the received variable item of information and through radio frequency communication communicates an item of information based on the displayed variable item of information to the SIM-NFC multi-application card.

According to a second particular embodiment, the invention is implemented by a system comprising the SIM-NFC card, as a portable electronic device, which cooperates with the mobile telephone as the host device, and a contactless reader equipped with optical recognition means, as an electronic read device. The SIM-NFC multi-application card, especially by using the screen of the mobile telephone, presents a variable item of information near the contactless reader, and in addition performs an optical reader function in order to read all or part of the variable item of information. The optical and contactless reader reads the displayed variable item of information, processes it and through radio frequency communication submits an item of information based on the variable item of information displayed on the SIM-NFC card.

The first embodiment, which requires the presence of a person, and the second form of embodiment, which is fully automatic, are used to secure a "contactless" mode of transaction desired by a user of the SIM-NFC card-mobile telephone equipment since the variable item of information is presented to the telephone's screen.

It is clear that on account of the application being used, the invention does not force any constraints within the portable electronic device. It can pertain to at least one application belonging to the following group:
  a bearer identification application,
  an external interlocutor authentication application;
  a bearer's loyalty application;
  an access control application to a restricted access zone or to a transportation service;
  an electronic payment application;
  a subscriber identification application.

Figure 1:
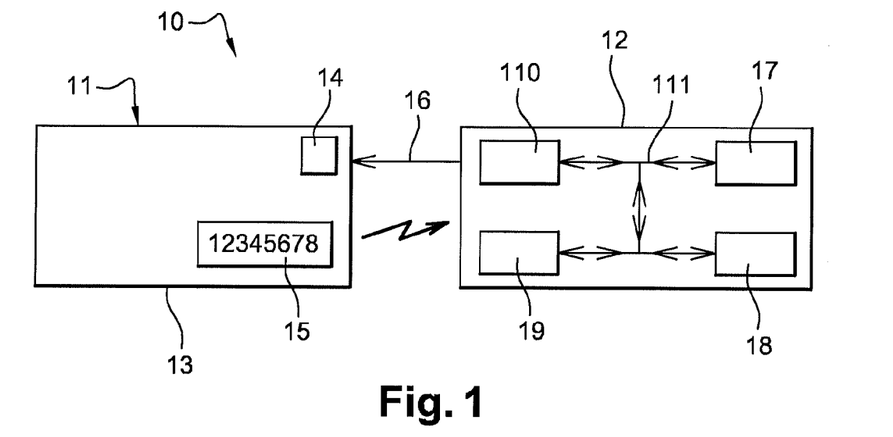
FIG. 1 describes a system, according to the invention, comprising an electronic passport or a chip, as the portable electronic device, which interacts with an electronic read device.

As described in the example given for FIG. 1, an electronic system 10 comprises an identification document of an object or of a person, such as an electronic passport 11, as a portable electronic device, and an electronic read device 12.

It must be noted that the passport 11 is only one specific form of a document to which the invention can be applied.

The invention can apply to any other identification document of an object or of a person, including the MRTD type document.

We can in particular give a list of chip items to which the invention can be applied, such as:
  a driving license;
  an identity card;
  a vehicle registration document;
  an immigration card;
  a residency permit;
  a stay document;
  an immigration card;
  a daily life card;
  a visa;
  Such a list is naturally not exhaustive.

The electronic passport 11, as it is deemed to be, comprises a data page, constituted of a base 13 with an integrated circuit 14 or electronic chip.

According to an alternative embodiment, the chip 14 is integrated within a page of the passport 11 other than that of the data page, such as, for example, that of the passport's cover 11.

The chip 14 (detailed in relation with FIG. 2) comprises an antenna in order to communicate with the outside through radio frequency waves. Typically, the chip 14 is a PICC type contactless chip.

Two information lines appear at the bottom on the base 13. The information lines are designed to be visible from the outside of the base 13. A part of the visible item of information is fixed. The fixed part of the visible item of information is frozen while the page 13 is being printed during the course of fabrication, during its customisation phase before its delivery to its bearer. The fixed part includes information specific to the identity of the passport's holder, such as the last name, first name, date and place of birth and information specific to the passport, such as its serial number and its expiry date.

A person, who has the passport 11, is deemed to be its bearer.

According to one form of embodiment of the invention, the electronic passport 11 comprises means to vary, in whole or in part, the item of information given on the base 13 visible from the outside.

In order to do this, the base 13 includes a push button (not shown), as the means for starting the generation of an item of information to be presented in whole or part to the outside. Thus, the bearer of the passport 11, by pressing on the push button, activates the generation of an item of information presented, for example, in the form of characters.

According to a variant, the means for starting the generation of an item of information are made up of a key or a combination of keys accessible by the bearer of the passport 11. For example, it can pertain to a key or to several keys of a keyboard connected through a contact interface developed within the optical reader 12, following the introduction of the allocated page of the chip 14 in a slot of the optical reader 12 designed for this purpose.

According to another form of embodiment, the chip 14 detects the sole presence of electromagnetic or sound waves or of one or several light rays, or even an electrical field in its surrounding environment, to start the generation of a variable item of information.

All or part of the visible item of information, with at least in part, a variable part comprises at least a Machine Readable Zone or MRZ.

In order to do this, the base 13 includes liquid crystal display or LCD (acronym for "Liquid Crystal Display") screen 15 designed in a predefined zone, to present all or part of the visible item of information. For example, the LCD screen 15 is placed at the right end of the first of the two information lines present and displays eight characters "12345678".

As such, the item of information including a fixed part and a variable part is presented on the outside of the base 13 in the present form of embodiment. The item of information can be modified. Upon a simple voluntary action from the bearer of the passport 11, the visible item of information is changed.

According to another form of embodiment, the chip is adapted to present, all or part of the visible item of information, through an external display, included in another electronic device with which the portable electronic device can cooperate, via another communication interface, for example a contact type (physical).

The item of information visible especially from the optical reader 12, as the electronic read device, can change dynamically. The entire, or, based on an alternative, only a part of the item of information presented on the LCD screen 15, is necessary to launch an authentication application supported by the chip 14.

The launched authentication application is then executed by the chip 14, and successfully comes to its end, when the item of information supplied by the chip 14, to the LCD screen 15 on the one hand, and, to the chip 14 on the other hand, through an external radio frequency communication channel 16, match.

All or part of the visible item of information, including all or part of the variable item of information, is used by the chip 14, for example, to authenticate an external interlocutor.

The visible item of information from the electronic read device 12 can change dynamically.

Such variability of visible item of information increases the number of available combination options of the presentable item of information.

In order to get the correct item of information used for accessing the chip 14 from the outside, a potential attacker will find it difficult to make greater number of attempts of combinations of data with regard to an item of information made up only of constant data.

Thus, the risk of usurping the variable item of information is lower in regard to the risk of usurping a single fixed item of information pertaining to the known solution explained above.

The electronic read device 12, including an Optical Character Recognition or OCR device, is suited and meant to be integrated with the passport 11.

The optical reader 12, as the external interlocutor, comprises a microprocessor 17, with different types of memories, symbolised by a single memory module 18, an Optical Character Recognition device 19 or OCR, and an antenna 110, as the communication interface with the outside.

It must be noted that the electronic read device 12 can be designed within a single unit or within two separate units. In the latter case, the OCR device 19 is located in the first unit, and the contactless reader is located in the second unit and is connected to the first unit for retrieving the item of information read by the OCR device.

Typically, the optical reader 12 is a PCD (acronym for "Proximity Coupling Device") type reader to which an internal OCR is added.

The microprocessor 17 monitors and processes the data as the central unit of the optical reader 12. The microprocessor 17 is connected through a data bus 111 to each item making up the optical reader 12. The microprocessor 17 monitors the data exchanges for internal and external communication to the optic reader 12.

The memory module 18 memorises one or more applications to be executed by the microprocessor 17, including an authentication application of an external interlocutor.

When the passport 11 is presented close to the reader 12, the OCR 19 is capable of reading both the lines of information visible on the base 13, including the eight displayed characters "12345678", or just one part, on the LCD screen 15.

The optical reader 12 makes an optical acquisition, especially, of all or part of the eight characters of variable item of information through optical scanning. The optical reader 12 selects all or part of the eight characters. The optical acquisition of all or part of the eight variable information characters is needed for accessing at least one application supported by the electronic passport 11. The reader 12 stores the selected characters within the memory module 18.

The microprocessor 17 executes an application by using, at least in part, the eight variable information characters. The microprocessor 17 applies a predetermined function F to the memorised selected characters. The microprocessor 17 gets an item of information based on the variable item of information as the result. The microprocessor 17 stores the result of the application based on the variable item of information acquired optically.

Through radio frequency waves the optical reader 12 sends a message to the passport 11, as data, with mainly the result of the application based on the variable item of information acquired optically.

Optionally, the optical reader 12 uses the result to encrypt the data to be transmitted to the passport 11 in order to access, for example, the data pertaining to its bearer stored in the memory.

The passport 11 and the optical reader 12 use at least one part of the variable item of information for an access control mechanism, for example, the BAC modified and adapted as a result.

It will be recalled that by using the visible item of information, such as the passport number, date of birth and the expiry date, the known BAC access control mechanism allows the reader and the passport, as the MRTD, to calculate the encryption and decryption keys, in order to access the data stored in the chip.

Due to the invention, the BAC access control mechanism is modified in order to also take into account all or part of the variable item of information displayed in the LCD screen 15.

Figure 2:
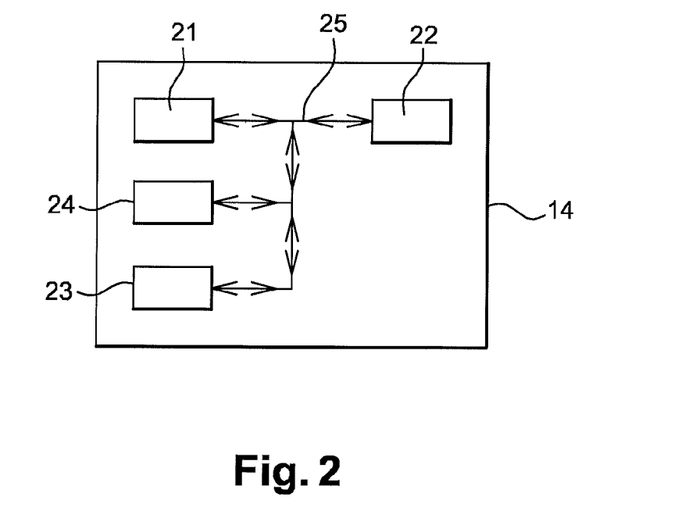
FIG. 2 illustrates a detailed drawing of the electronic passport's chip of the system given in FIG. 1.

In a detailed manner FIG. 2 shows the chip 14 of the passport's 11 data page. The chip 14 comprises a microprocessor 21, an antenna 22, as the communication interface with the outside, one or more different types of memories represented by a single memory module 23, and the internal power supply means 24, connected together through a data bus 25.

The microprocessor 21 or a microcontroller monitors and processes the chip data 14. The microprocessor 21 constitutes the central unit of the control chip 14 of the chip's 14 items.

According to an alternative, a logical unit monitors and processes the chip data, and is substituted by a microprocessor or a microcontroller.

Advantageously, the chip 14 supplies the variable item of information to be displayed on the LCD screen 15. In order to do this, the microprocessor 21 executes a variable item of information generation application, for example with the help of a predetermined random number generation function G, or a sequential or non-sequential reading of a variable data table provided for this purpose.

According to a variant, the variable item of information is supplied by an entity external to the passport 11, as the portable electronic device. The external entity responsible for supplying variable item of information to be displayed is, for example, connected through a contact interface to the portable electronic device. The external entity is in physical contact at the level of their respective corresponding interfaces with the portable electronic device.

The memory module 23 stores one or more applications, including an authentication application of an interlocutor external to the portable electronic device. The module 23 memorises an application based on the pre-determined function F shared with the reader 12. Moreover, the module 23 memorises all or part of the variable item of information to be displayed on the LCD screen 15. In addition, module 23 stores information specific to the biometric characteristics, such as a photo of the face, a print of one or more fingers, and/or of the iris of an eye or the eyes of the concerned bearer.

Microprocessor 21 decides to authorise or prohibit access to its memory module 23, from the outside of the passport 11. The decision is taken after making a comparison of an item of information received from the outside, through the radio frequency channel 16, and a comparative item of information. The comparative information is based on all or part of the variable item of information displayed on the LCD screen 15.

In order to take decision, the microprocessor 21 applies the function F to all or part of the variable item of information for determining the comparative information. The function F applied to all or part of the eight characters on both sides, i.e. by the passport 11 and by the optical reader 12, are identical.

The chip 14 is capable of detecting the presence of an electromagnetic field emitted by a contactless reader.

The antenna 22 receives a message along with data of which at least some, on the application of the function F, should correspond to all or part of the eight variable information characters.

The microprocessor 21 retrieves and processes the message accompanied by data. The microprocessor 21 extracts the data, selects what is pertaining to the information to be compared with the comparison information. If the compared information matches, then the microprocessor 21 gives access to the data stored in the memory module 23. Such data is relative to a demanded application, and/or, to information specific to the biometric data pertaining to its bearer.

A battery constitutes the internal power supply means 24. The battery 24 supplies power to all the components of the electronic passport 11 for its operation.

By way of an advantage, the battery 24 is, at least in part, rechargeable. In order to recharge the battery 24, the battery 24 is equipped with energy sensors from an external electromagnetic field generated by the optical reader 12, solar energy sensors, and/or the light energy sensors.

According to an alternative, no internal power supply means is planned within the passport 11. According to such an alternative, the energy is retrieved from an external electromagnetic field.

Figure 3:
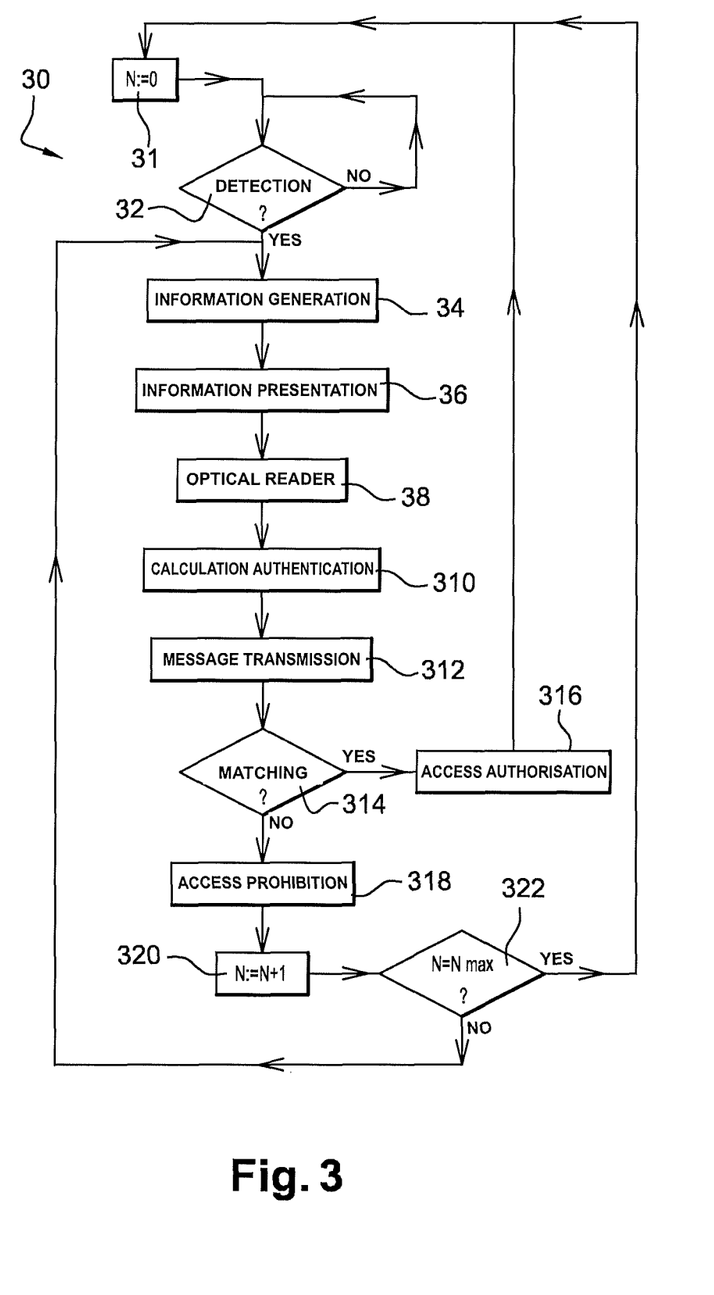
FIG. 3 describes a simplified flow chart of an example of a process that is implemented by the system given in 1 in order to access a memory zone of the electronic passport's chip.

FIG. 3 shows a flow chart of a particular form of embodiment of the process 30 according to the implemented invention for accessing a memory zone of the passport 11.

First of all, the chip 14 of the passport 11 initialises a ratification counter 31, by assigning it a null value.

Next, during step 32 of the test, the chip 14 tests 32 whether there has been a press action on the push button. As long as no press action is detected by the chip 14, the step 32 of the test is looped.

According to a variant, it pertains to detecting the presence of an electromagnetic field when the passport 11 is entered within the electromagnetic field generated by the reader 12 equipped with a radiating antenna.

As soon as the chip 14 has detected a press action on the push button, the chip 14 generates 34 a variable item of information.

Once generated, all or part of the variable item of information is sent 36 to the outside of the passport 11, through the LCD screen 15.

When a pass is made suitably close to the OCR 19, the OCR 19 reads all or part of the visible item of information including all or part of the variable item of information displayed on the LCD screen 15.

As an option, the variable item of information is shown to the outside for a predefined time period given to the optical reader for acquiring the variable item of information, for example 3 seconds.

According to an alternative, an action of the bearer, such as a press on a push button blocks the power supply of the LCD screen 15, to invalidate the displayed variable item of information.

The chip 14 determines 310, at its end, a first authentication value by applying a function F or pre-determined algorithm, by using mainly all or part of the read variable item of information on input.

Similarly, the optical reader 12 determines 310, a second authentication value by applying the same pre-determined function or algorithm, also by using mainly all or part of the read variable item of information on input.

The optical reader 12 sends 312 to the passport 11 a message along with the second authentication value.

Once the message is read, the chip 14 compares 314 the first and the second authentication values in order to decide whether there is a match.

If yes, i.e., if the first and the second authentication values match, the chip 14 authorises 316 access to a memory zone of the memory module 23, for example the biometric data specific to its bearer. Next, subsequent to a successful comparison between the two authentication values generated by each of the two involved parts, the value of the counter on initialisation step 31 is looped to zero.

If in the negative, i.e. when the first and second authentication values do not match, then the chip 14 prohibits 318 all access to a memory zone of the memory module 23.

After a comparison failure between the two authentication values, the value of a ratification counter is incremented 320.

Next, the chip 14 tests 322 whether the ratification counter has reached a maximum pre-determined ratification value, e.g. 10.

As long as the value of the ratification counter is strictly less than the maximum ratification value, then we loop on step 34 for the generation of a new variable item of information meant to be read, at least in part.

Else, as soon as the ratification counter has reached its maximum ratification value, then we loop on step 31 for the initialisation of the counter's value to zero.

Even though the invention has been mainly described in relation to a memory access, it is applicable in general in controlling the functioning of a device, preferably of the portable kind. The device authorising or prohibiting an operation based on the result of a test comprises proximity reading of a known variable item of information of the device and then transforming it with the help of an algorithm or preferably cryptographic shared method and then comparing the returned result in the device in order to authorise its operation or cooperation. The functioning can be total or partial and can in particular include read or write memory access authorisation, communication of the device with the outside through means of communication, etc.

The invention claimed is:

1. A portable electronic device comprising:
   a processor configured to generate a first item of variable information;
   a display configured to display first visible information comprising: (i) a first portion comprising the first item of variable information, and (ii) a second portion comprising an item of fixed information, wherein display of information via the first portion is configured to vary and display of information via the second portion is configured to be fixed;
an interface configured to receive an other item of information, from an electronic communication device, wherein the other item of information is based at least in part on the first item of variable information and the item of fixed information; and
wherein the processor is further configured to compare the other item of information and at least part of the first item of variable information, and
authorise a communication exchange between the electronic communication device and the portable electronic device, based on at least in part the other item of information and the first item of variable information.

2. The portable electronic device according to claim 1, wherein the portable electronic device comprises means for starting the supply of the first item of variable information.

3. The portable electronic device according to claim 2, wherein the means for starting the supply of the first item of variable information comprises means for detecting an entry of the portable electronic device within an electrical, electromagnetic, light and/or sound field.

4. The portable electronic device according to claim 3, wherein the means for starting the supply of the first item of variable information comprises at least a key that can be externally activated.

5. The portable electronic device according to claim 2, wherein the means for starting the supply of the first item of variable information comprises means for generating a random or variable number.

6. The portable electronic device according to claim 1, wherein the interface is of a contact type and/or contactless type.

7. The portable electronic device according to claim 1, wherein the portable electronic device comprises power supply means that is rechargeable or non-rechargeable.

8. The portable electronic device according to claim 1, wherein the portable electronic device is a chip card of a type included within a list comprising:
an electronic identification of an object and/or a person;
an electronic passport;
a health card;
an electronic payment;
an electronic ticket; and/or
a subscriber identification module having a radio frequency means for external communication.

9. The portable electronic device according to claim 1, wherein, prior to displaying the first visible information, the display is further configured to display, second visible information comprising: (i) the first portion comprising a second item of variable information different than the first item of variable information, and (ii) the second portion comprising the item of fixed information.

10. The portable electronic device according to claim 9, wherein, responsive to receiving an instruction, the display is configured to change the first portion from displaying the second item of variable information to displaying the first item of variable information, while displaying the item of fixed information.

11. System for authorising communication, said system comprising:
a portable electronic device; and
an electronic communication device,
said portable electronic device comprising:
a processor configured to generate a first item of variable information,
a display configured to display first visible information comprising: (i) a first portion comprising the first item of variable information, and (ii) a second portion comprising an item of fixed information, wherein display of information via the first portion is configured to vary and display of information via the second portion is configured to be fixed,
an interface configured to receive an other item of information, from the electronic communication device, wherein the other item of information is based at least in part on the first item of variable information and the item of fixed information, and
wherein the processor is further configured to:
compare the other item of information and at least part of the first item of variable information, and
authorise a communication exchange between the electronic communication device and the portable electronic device, based on at least in part the other item of information and the first item of variable information; and
wherein the electronic communication device is configured to:
read or retrieve the first item of variable information and the item of fixed information, and
communicate the other item of information to the portable electronic device based at least in part on the first item of variable information.

12. The system according to claim 11, wherein, prior to displaying the first visible information, the display is further configured to display, second visible information comprising: (i) the first portion comprising a second item of variable information different than the first item of variable information, and (ii) the second portion comprising the item of fixed information.

13. The system according to claim 12, wherein, responsive to receiving an instruction, the display is configured to change the first portion from displaying the second item of variable information to displaying the first item of variable information, while displaying the item of fixed information.

14. A process for authorising communication with a portable electronic device, comprising:
generating, by the portable electronic device, a first item of variable information;
displaying, on the portable electronic device, first visible information comprising:
(i) a first portion comprising the first item of variable information, and (ii) a second portion comprising an item of fixed information, wherein display of information via the first portion is configured to vary and display of information via the second portion is configured to be fixed;
receiving, by an electronic communication device, the displayed first item of variable information and the item of fixed information;
receiving, at the portable electronic device, an other item of information, from the electronic communication device, wherein the other item of information is based at least in part on the received first item of variable information and the item of fixed information;
comparing, in the portable electronic device, the other item of information and information based on at least part of the first item of variable information; and
authorising a communication exchange between the electronic communication device and the portable electronic device based on the comparing.

15. The process according to claim 14, further comprising prior to generating the first item of variable information, starting the supply of the first item of variable information.

16. The process according to claim 15, wherein the starting the supply of the first item of variable information comprises receiving, at the portable electronic device, at least one item of information representative of a successful comparison pertaining to a previous reading of the first item of variable information.

17. The process according to claim 14,
wherein receiving, by an electronic communication device, the displayed first item of variable information and the item of fixed information comprises optically reading the displayed first item of variable information and the item of fixed information,
wherein the optical reading allows access to at least one application on the portable electronic device.

18. The process according to claim 17, wherein the at least one application is included within a following list:
an identification application of a bearer;
an interlocutor authentication application of the portable electronic device;
a bearer's loyalty application;
an access control application to a restricted access zone or to a transportation service;
an electronic payment application; and/or
a subscriber identification application.

19. The process according to claim 14 for identifying a bearer of the portable electronic device, wherein the process comprises:
optically reading the first item of variable information by an electronic reading device;
determining a first authentication value by the electronic reading device according to a pre-determined authentication algorithm and the first item of variable information;
receiving the first authentication value through the portable electronic device by way of a radio frequency link from the electronic reading device;
comparing the first authentication value with a second authentication value by the portable electronic device, wherein the second authentication value is a function of the first item of variable information;
if the first and second authentication values match, granting access authorisation by the portable electronic device to the at least one memory zone in the portable electronic device.

20. The process according to claim 14, wherein, prior to displaying the first visible information, the process further comprises displaying second visible information comprising: (i) the first portion comprising a second item of variable information different than the first item of variable information, and (ii) the second portion comprising the item of fixed information.

21. The process according to claim 20, wherein, responsive to receiving an instruction, changing the first portion from displaying the second item of variable information to displaying the first item of variable information, while displaying the item of fixed information.

* * * * *